United States Patent
Bauer et al.

(10) Patent No.: US 7,402,010 B2
(45) Date of Patent: Jul. 22, 2008

(54) DISK-SHAPED OR STRIP-SHAPED TOOL

(75) Inventors: Manfred Bauer, Rosstal (DE); Reinhold Gesell, Weihenzell (DE); Günther Gnibl, Lichtenau (DE)

(73) Assignee: Kennametal Widia GmbH & Co. KG, Essen (DE)

( * ) Notice: Subject to any disclaimer, the term of this patent is extended or adjusted under 35 U.S.C. 154(b) by 554 days.

(21) Appl. No.: 10/524,806

(22) PCT Filed: Aug. 2, 2003

(86) PCT No.: PCT/DE03/02604

§ 371 (c)(1),
(2), (4) Date: Feb. 10, 2005

(87) PCT Pub. No.: WO2004/020133

PCT Pub. Date: Mar. 11, 2004

(65) Prior Publication Data

US 2006/0002779 A1    Jan. 5, 2006

(30) Foreign Application Priority Data

Aug. 13, 2002 (DE) ............................. 102 37 656
Aug. 22, 2002 (DE) ............................. 102 38 451
Jun. 3, 2003 (DE) ............................. 103 25 265

(51) Int. Cl.
B23C 5/24    (2006.01)

(52) U.S. Cl. .......................... 409/234; 407/37; 407/40; 407/46

(58) Field of Classification Search ............ 407/37–40, 407/44–46, 51; 409/232, 234; 408/156, 408/714; B23C 3/06, 5/24, 5/22
See application file for complete search history.

(56) References Cited

U.S. PATENT DOCUMENTS

| 3,023,486 | A | * | 3/1962 | Bogner ........................ 407/39 |
| 3,236,125 | A | * | 2/1966 | Lundgren ................... 408/197 |
| 3,276,101 | A | * | 10/1966 | Plein .......................... 408/157 |
| 3,839,772 | A | * | 10/1974 | Shimomura et al. ........... 407/36 |
| 3,847,555 | A | * | 11/1974 | Pegler et al. .................. 407/36 |

(Continued)

FOREIGN PATENT DOCUMENTS

DE    24 38 872    3/1975

(Continued)

*Primary Examiner*—Daniel W Howell
(74) *Attorney, Agent, or Firm*—Andrew Wilford (57) ABSTRACT

A machine tool for cutting a profile in a rotating workpiece has a body centered having an elongated edge formed with an angularly extending row of seats each having a radially directed seat face and an axially directed seat face. Respective Z-shaped holders in the seats each have an outer part, an inner part parallel thereto, and a flexible middle part transversely connecting the inner and outer parts. Respective fasteners releasably fixing the inner parts to the body against relative movement. Respective cutting are fixed on the outer parts of the holders. An adjustment wedge between one of the seat faces and the respective holder face is displaceable to shift the outer part of the respective holder relative to the body and transversely of the respective one seat face.

15 Claims, 6 Drawing Sheets

U.S. PATENT DOCUMENTS

| | | | | |
|---|---|---|---|---|
| 3,914,841 A | * | 10/1975 | Borgardt | 407/81 |
| 4,547,100 A | * | 10/1985 | Naccarato et al. | 407/39 |
| 4,623,284 A | * | 11/1986 | Greiff | 407/38 |
| 4,848,977 A | * | 7/1989 | Kieninger | 407/39 |
| 4,964,763 A | * | 10/1990 | Kieninger | 407/40 |
| 5,188,490 A | * | 2/1993 | Muendlein et al. | 408/146 |
| 5,209,610 A | * | 5/1993 | Arai et al. | 407/36 |
| 6,273,651 B1 | | 8/2001 | Heinloth | 407/116 |

FOREIGN PATENT DOCUMENTS

| | | |
|---|---|---|
| DE | 25 26 345 | 12/1976 |
| DE | 2806079 B1 * | 3/1979 |
| DE | 3736246 A1 * | 5/1989 |
| DE | G9100854 | 4/1992 |
| DE | 100 27 945 | 1/2002 |
| EP | 0 296 771 | 10/1988 |
| EP | 0 313 644 | 1/1994 |
| EP | 0 830 228 | 3/1996 |
| WO | WO 99/12685 | 3/1999 |

* cited by examiner

DISK-SHAPED OR STRIP-SHAPED TOOL

CROSS REFERENCE TO RELATED APPLICATIONS

This application is the US national phase of PCT application PCT/DE2003/002604, filed 2 Aug. 2003, published 11 Mar. 2004 as WO 2004/020133, and claiming the priority of German patent application 10237656.5 itself filed 13 Aug. 2002, German patent application 10238451.7 itself filed 22 Aug. 2002, and German patent application 10325265 itself filed 3 Jun. 2003.

FIELD OF THE INVENTION

The invention relates to a disk- or bar-shaped tool for chip-removing machining, in particular for cutting profiles in a workpiece such as a rotationally driven crankshaft to be machined, having several peripheral cutting inserts radially clamped to a tool mount.

Disk-shaped high-speed tools are described in EP 0,830,228 which are driven such that material is machined off at rotation speeds above 160 RPM. In particular when machining a crankshaft and in particular for forming undercuts, disk millers are used where the tool mounts, to whose periphery the cutting inserts are radially clamped, are formed as complete circular disks. During external milling of a crankshaft, both the crankshaft and the milling tool are rotated.

The present invention relates to such tools that are used as rotational tools in so-called single or double rotary systems. In a single rotary system a linear tool is radially moved toward the rotating workpiece. In a double rotary system a row of cutting inserts carried on a part-circular periphery of a flat tool mount are indexed along a drum periphery. This tool is moved along an arc radially toward the rotating workpiece as described in principal in EP 0,313,644 or EP 0,286,771. Both in the single rotary system as well as with disk millers or in the double rotary system using radially clamped cutting inserts, as for example having the shape shown in WO 99/12686, there is in the constructions known from the prior art no possibility of axial and radial fine adjustment. Manufacturing tolerances alone in the tools and tool mounts thus produce production errors.

OBJECT OF THE INVENTION

It is an object of the invention to provide a tool that allows axial and/or radial adjustment of the cutting inserts radially clamped to the tool mount. This tool should be simple in construction and easy to use.

SUMMARY OF THE INVENTION

This object is attained by the tool where at least one cutting insert is fixed in a cassette-shaped holder and the cassette-shaped holder is axially adjustable by means of an adjustment wedge near where it bears on the cutting insert and/or is radially adjustable by an adjustment wedge. The cutting inserts, which need to be axially and/or radially adjusted, are each mounted on a cassette-shaped holder (and not as in the prior art directly on the tool mount), and this holder is axially and/or radially adjustable by the adjustment wedge.

In particular the cassette-shaped holder has a doubly bent shape with an upper part having a front face forming the support surface for the cutting insert and a back face bearing on an adjustment wedge, and a lower part extending parallel to but offset from the upper part is fixed on the disk-shaped mount by means of a mounting screw passing through a bore, the upper and lower parts being connected by a central transverse web. The adjustment wedge can shift the upper part into different axial positions by bending. The Z-shape of the cassette-shaped part produces a certain elasticity so that the upper part of this holder can pivot to a certain extent about an axis passing generally through the transverse web. Since the cutting insert if fixed on the upper part of the cassette-shaped holder, it is thus pivotal. Preferably the axial range of adjustment is between 0.1 mm and 0.3 mm, which can be ensured by the material and the geometric shape of the cassette-shaped holder. The upper limit lies well below the amount that would create plastic deformation of the cassette-shaped holder.

For mounting on the disk-shaped tool mount, the lower part of the cassette-shaped holder has a threaded bore into the rear of which engages a screw seated in the tool mount. Preferably a cap screw is used that is screwed into the lower part of the cassette-shaped holder from the back.

Should only or additionally a radial adjustment of the cutting tool be desired, there is an adjustment wedge that bears on a lower side face of the holder and that is movable to effect a radial adjustment of the holder. According to the change in position of this adjustment wedge, the cassette and its cutting insert are radially shifted.

Preferably the lower part of the cassette-shaped holder has a stepped bore accommodating a shaft and a head of a mounting screw whose head bears with a face on a complementary shoulder of the bore. A shaft of the mounting screw engages in a threaded bore of the disk-shaped tool mount. Unlike the above-described embodiment, the clamping screw is fitted from the front side into the lower part of the cassette-shaped holder and is threaded into a complementary bore of the disk-shaped tool mount until it is tight.

The adjustment wedge preferably has a through going threaded bore receiving a threaded end of a double-threaded screw whose other end is engaged in a threaded bore of the disk-shaped tool mount. Rotation of this double-threaded screw can thus change the relative positions of the adjustment wedge and the cassette-shaped holder.

To clamp the cassette-shaped holder in place there is a counter screw that engages in a stepped bore of the disk-shaped tool mount and a threaded blind bore in a back face of the upper part of the cassette-shaped support.

To further improve exact position of the cutting insert, according to a further embodiment of the invention the mounting screw for clamping the cassette-shaped holder 12 bears with axially and/or radial prestress on the disk- or bar-shaped tool mount. Preferably the cutting insert is indexable and has a PKD insert.

According to a further embodiment of the invention in additional to the radial clamped cutting inserts on the disk-shaped tool mount there is at least one tangentially clamped cutting insert or a bar-shaped tool mount carries on its upper edge a clamped cutting insert. This additional cutting insert that is tangentially clamped or clamped to the upper edge is radially adjustable for working the outer surface profile of a workpiece, in particular for machining the outer surfaces of the crank pins of a crankshaft. This or these cutting inserts are also radially adjustable.

Preferably the tangentially or upper-edge-mounted cutting insert is fixed in a cassette that is mounted in a tool-mount seat and is adjustable radially by an adjustment wedge. To position the cassette and its cutting insert radially there is at lest one adjustment wedge. There is also preferably a clamping wedge for holding the cassette in place.

The clamping wedge and/or the adjustment wedge are engaged by a double-threaded screw having one end engaged in a throughgoing hole of the adjustment wedge or of the clamping wedge and another end in a threaded bore of the tool mount.

In order to make a shallow cut when lathing and to provide a maximum possible number of cutting inserts on the tool mount being used, the tangential or edge-mounted cutting inserts can be mounted as described in DE 100 27 945. In this publication preferably axial set angles and relative spacings of the cutting inserts are described.

BRIEF DESCRIPTION OF THE DRAWING

Further advantages and embodiments of the invention are described with reference to the drawings. Therein.

SPECIFIC DESCRIPTION

Figure 1:
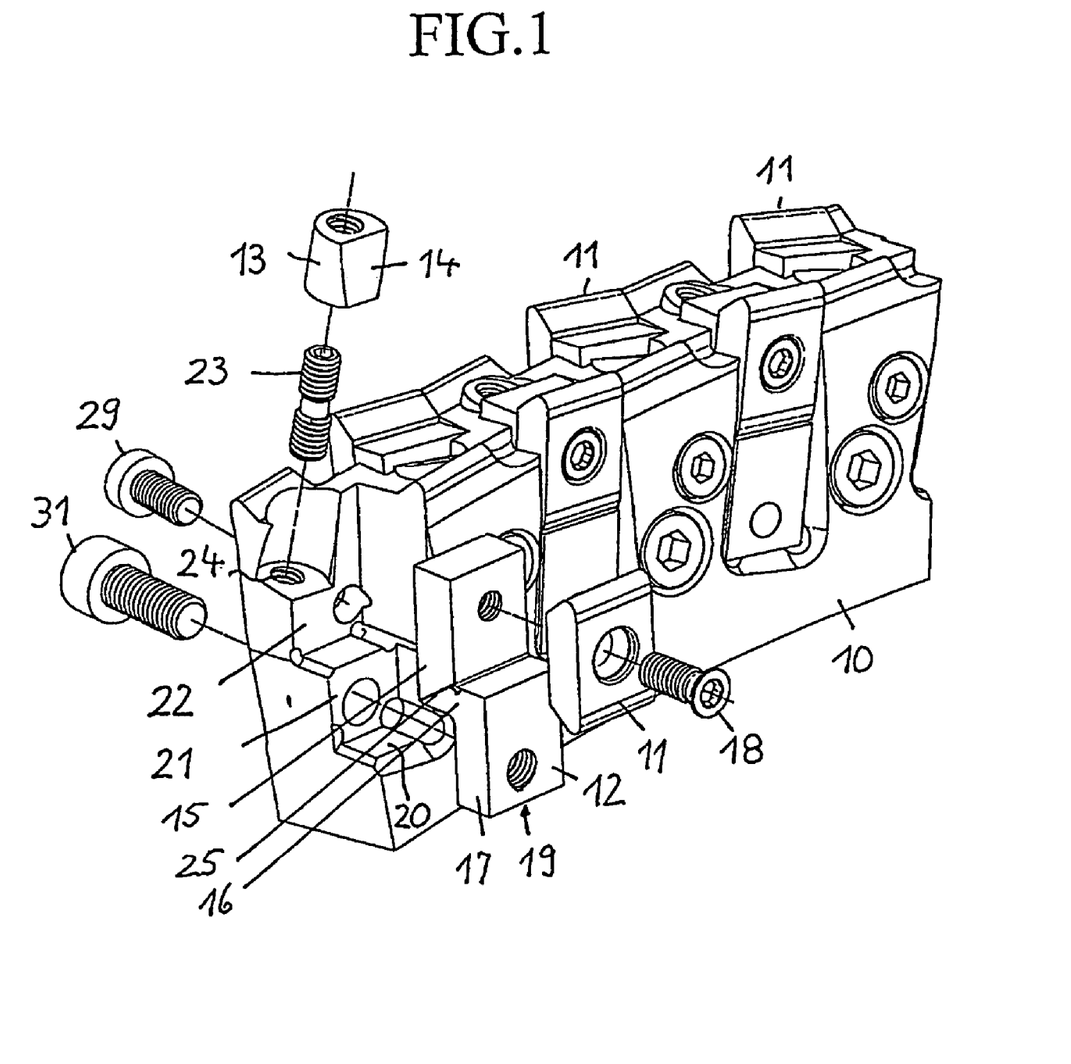
FIG. 1 shows partly in exploded view a milling tool with radially clamped and axially adjustable cutting inserts.
Figure 3:
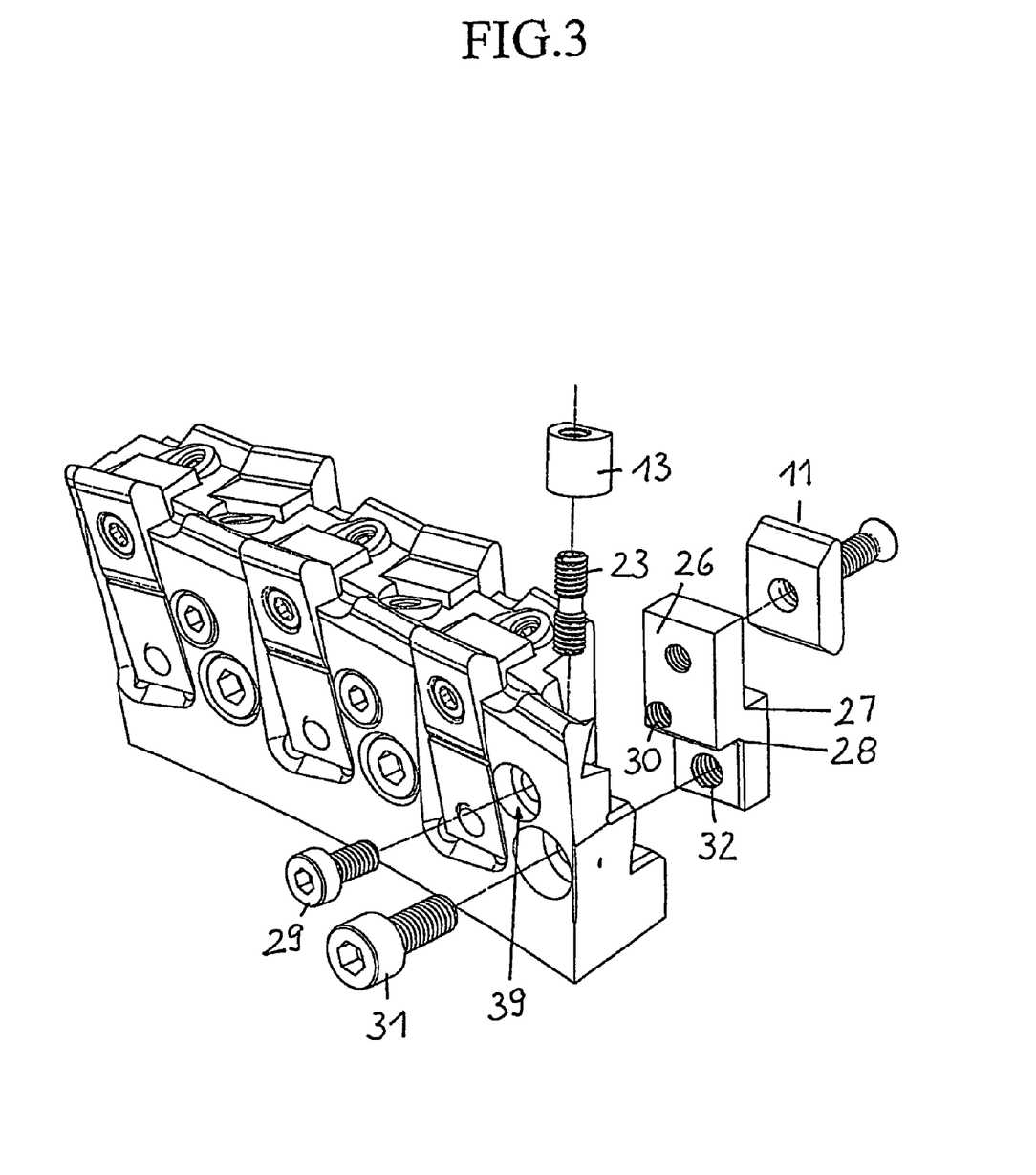
FIG. 3 shows partly in exploded view a milling tool with radially clamped and both radially and axially adjustable cutting inserts.

As already stated, according to the selected machining method a tool mount 10 can be formed as a disk miller or as a bar for use in single or double rotary machining or can be formed as a body that is a part-circular segment. The tool mount has along its periphery or edge radially clamped cutting inserts; in this case three on each side. The cutting inserts have shapes designed for cutting profiles, in particular grooves or undercuts on crankshafts. For example cutting inserts of the type described in WO 99/12685 (U.S. Pat. No. 6,273,651) are used. In the embodiment illustrated in FIG. 1 all of the cutting inserts 11 are axially adjustable. To this end a cassette-like holder 12 and an adjustment wedge 13 with a wedge face 14 are used. The cassette-shaped holder 12 has an upper part 15, a transverse web 16, and a lower part 17 that are unitarily formed with each other and that generally form a Z-shape. Each cutting insert 11 is fixed by a respective mounting screw 18 to the respective cassette-shaped support 12. The tool mount 10 has seats complementary to the Z-shaped supports 19 so that a lower face of the support 12 sits on a face 20 and a back face of the lower part 17 lies on a face or back side 21 and a back face 26 (FIG. 3) of the upper part 15 on a face 22.

The adjustment wedge 13 has a throughgoing threaded bore in which is engaged one threaded end of a double-threaded screw 23 whose other end is threaded into a bore 24 of the tool mount. Rotation of the double-threaded screw 13 shifts the adjustment wedge linearly along a longitudinal axis of the double-threaded screw. Since the wedge face 14 bears on the back face 26 of the upper part 15, such movement of the adjustment wedge 13 exerts pressure on the back face 26 (see FIG. 3) of the upper part 15 leading to an outward flexing of the upper part 15 about a line 25 extending between points 27 and 28 (see FIG. 3). In this region of elastic deformation of holder 12, the cutting insert 11 can be shifted axially up to 0.3 mm. When the desired axial position of the cutting insert 11 is reached, a cap-head screw 29 is engaged into a threaded bore 30 opening at the back face 26 to clamp it in place. To clamp the lower part 17 of the holder 12 in place there is preferably a somewhat larger cap screw 31 that engages with its threaded shaft into a threaded bore 32 of the lower part 17 of the holder 12. The cutting inserts 11 are spaced apart on each side and alternate from side to side, so that between two adjacent cutting inserts 11 on one side there is space for the throughgoing holes to accommodate the screws 29 and 31 for the staggered and opposite cutting plates 11.

Figure 2:
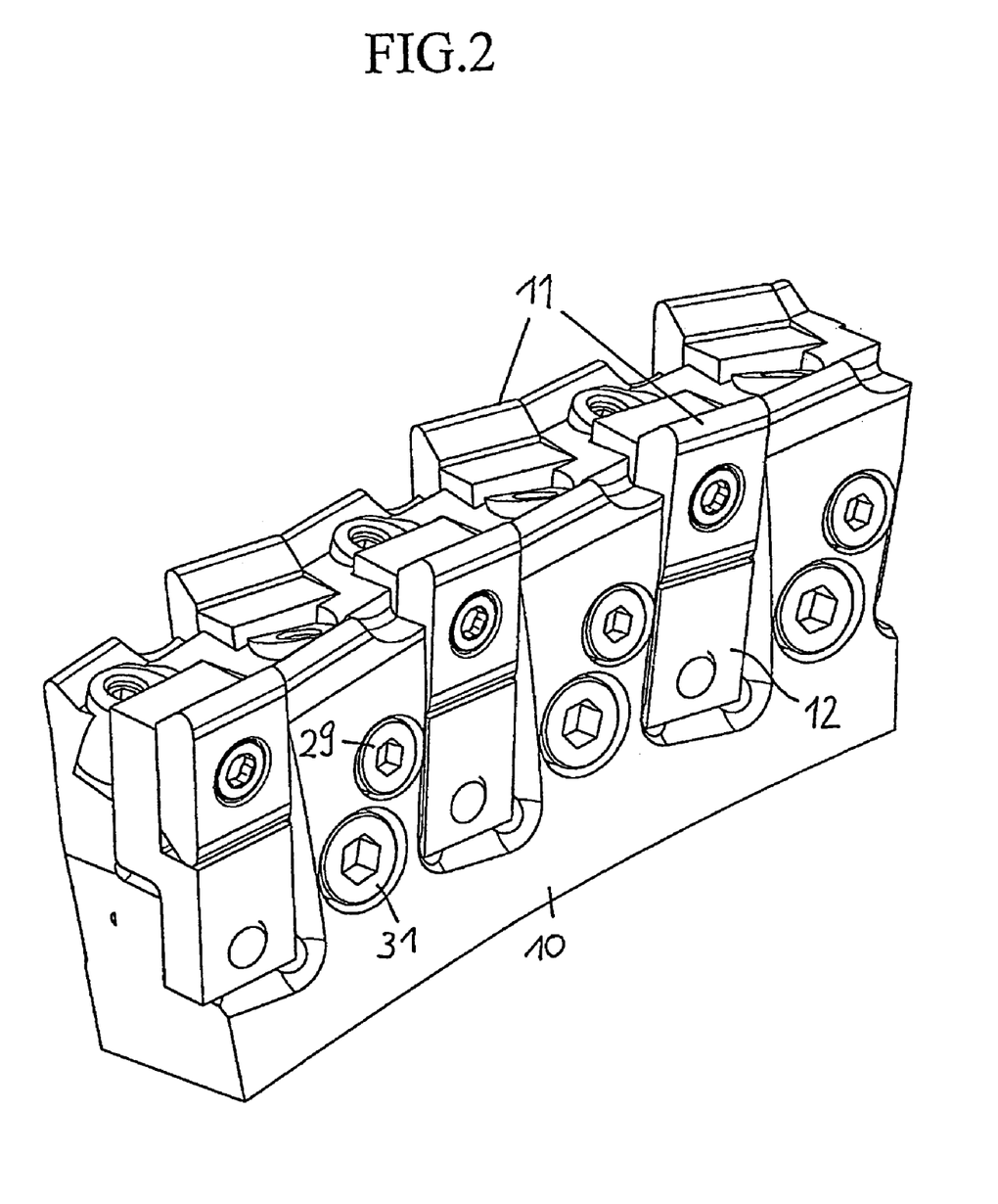
FIG. 2 shows the tool of FIG. 1 in assembled condition.
Figure 4:
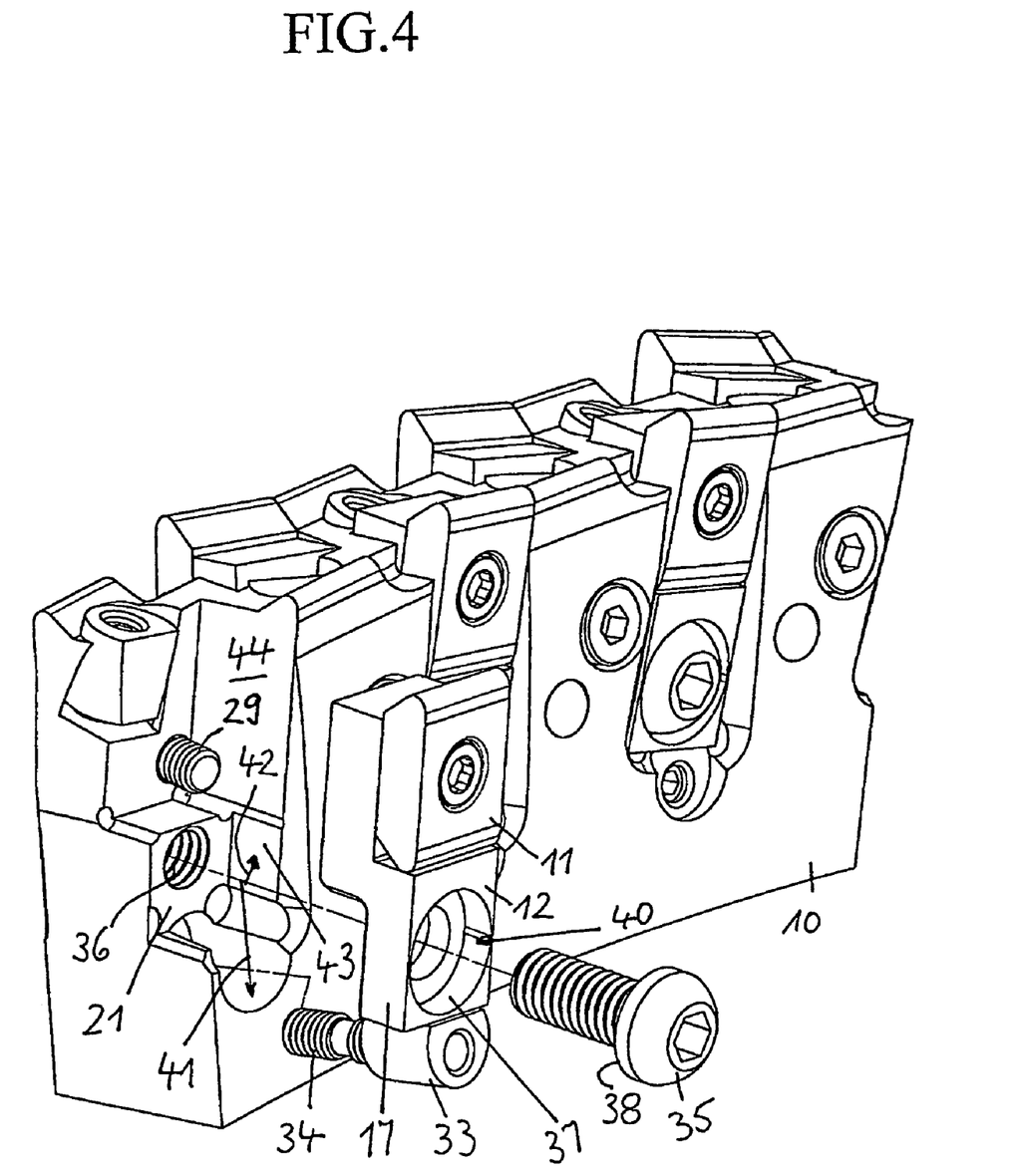
FIG. 4 shows partly in exploded view another view of the tool of FIG. 3.
Figure 5:
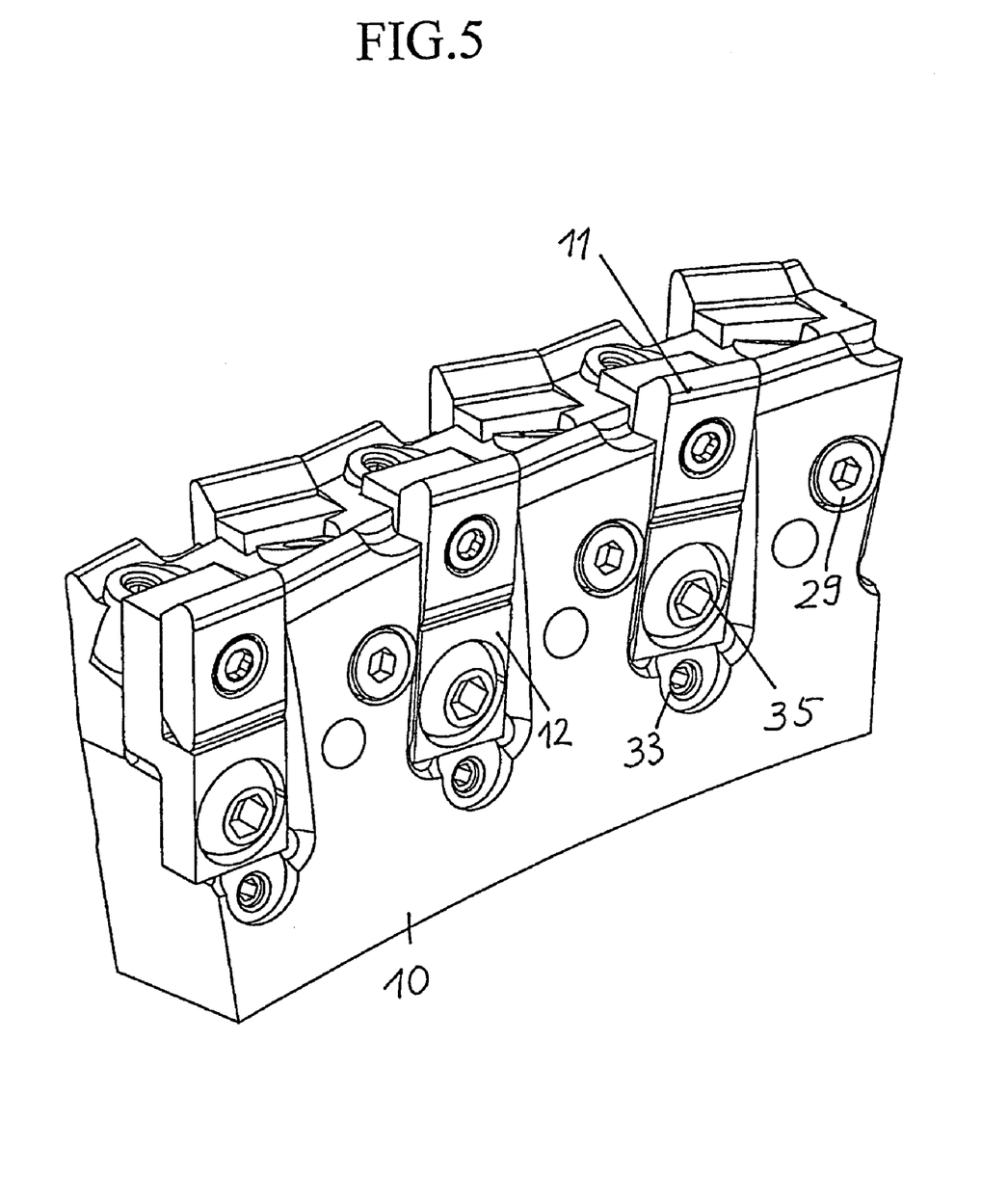
FIG. 5 is the tool of FIGS. 3 and 4 in assembled condition.

In addition to the axial adjustment, the cutting inserts 11 according to the embodiment of FIGS. 4 and 5 can be radially adjusted (see FIGS. 4 and 5). For radial adjustment of each holder 12 there is a respective adjustment wedge 33 that is similar to the adjustment wedge 13 and linearly shiftable by a respective double-threaded screw 34. This adjustment wedge 33 bears on the lower face of the holder 12. Turning the double-threaded screw 34 in one direction shifts the holder 12 and the cutting insert 11 carried on it radially outward. In contrast to the system of FIGS. 1 to 3 with only axial adjustment, the wedge face (instead of the face 20) of the adjustment wedge 33 serves as a base support.

In order to clamp the holder 12 in place there is a clamping screw 35 that engages with its shaft in a bore 36 of the tool mount 10. The lower part 17 of the holder has on its front face a stepped bore 40 with an annular shoulder face 37 that bears in the clamped position on a complementary annular face 38 of the clamping screw 35. The axial adjustment is effected as described above with reference to FIGS. 1 to 3. Each of the bores 40 and 39 (see FIGS. 3 and 4) must be dimensioned such that the respective screws 35 and 29 can shift into any selected position of the cutting insert without being blocked. The clamping is effected however by surface contact of the annular faces of the stepped bores and the screw heads.

In addition, in order to ensure exact positioning of the cutting insert 11, the clamping screw 35 is prestressed radially (see FIG. 4 arrow 41) and axially (see arrow 42). This exerts additional force toward the support face 20 (see FIG. 1) or radially toward the adjustment wedge 33 and axially toward the faces 43 and 44. This type of prestressing can be used with only axial adjustment as well as with axial and radial adjustment of the cutting insert.

In contrast to the tool of FIGS. 1 to 5, FIG. 6 shows a tool mount 50 that is set up as a disk miller holding both radially clamped cutting inserts 51 as well as tangentially clamped cutting inserts 51. An outer periphery of the disk miller is formed with a row of pairs of radially clamped cutting inserts and alternating tangentially clamped cutting inserts 51. The radial adjustment of the radially clamped cutting inserts 11 is the same as in FIGS. 1 to 5. The tangentially clamped cutting inserts 51, which have in top view a rectangular and in particular square outer face, are set in seats of respective cassettes 52 and secured in place by mounting screws. The cassettes 52 are held in position by a clamping wedge 53 and a double-threaded screw 54 in respective seats of the mount 50. Each cassette 52 is radially adjusted by an adjustment wedge 55 that has a threaded bore in which one end of a double-threaded screw 56 whose other end is engaged in the mount is engaged. Actuation of the double-threaded screw shifts the adjustment wedge 55 that bears radially outward with its face 47 on the cassette 53 and shifts it radially outward or inward. To radially adjust the cassette 52 and its cutting insert 51, first the clamp wedge 3 is loosened, then the adjustment wedge 53 is set for the desired radial position, and then the cassette is fixed in place by the clamping wedge.

Figure 6:
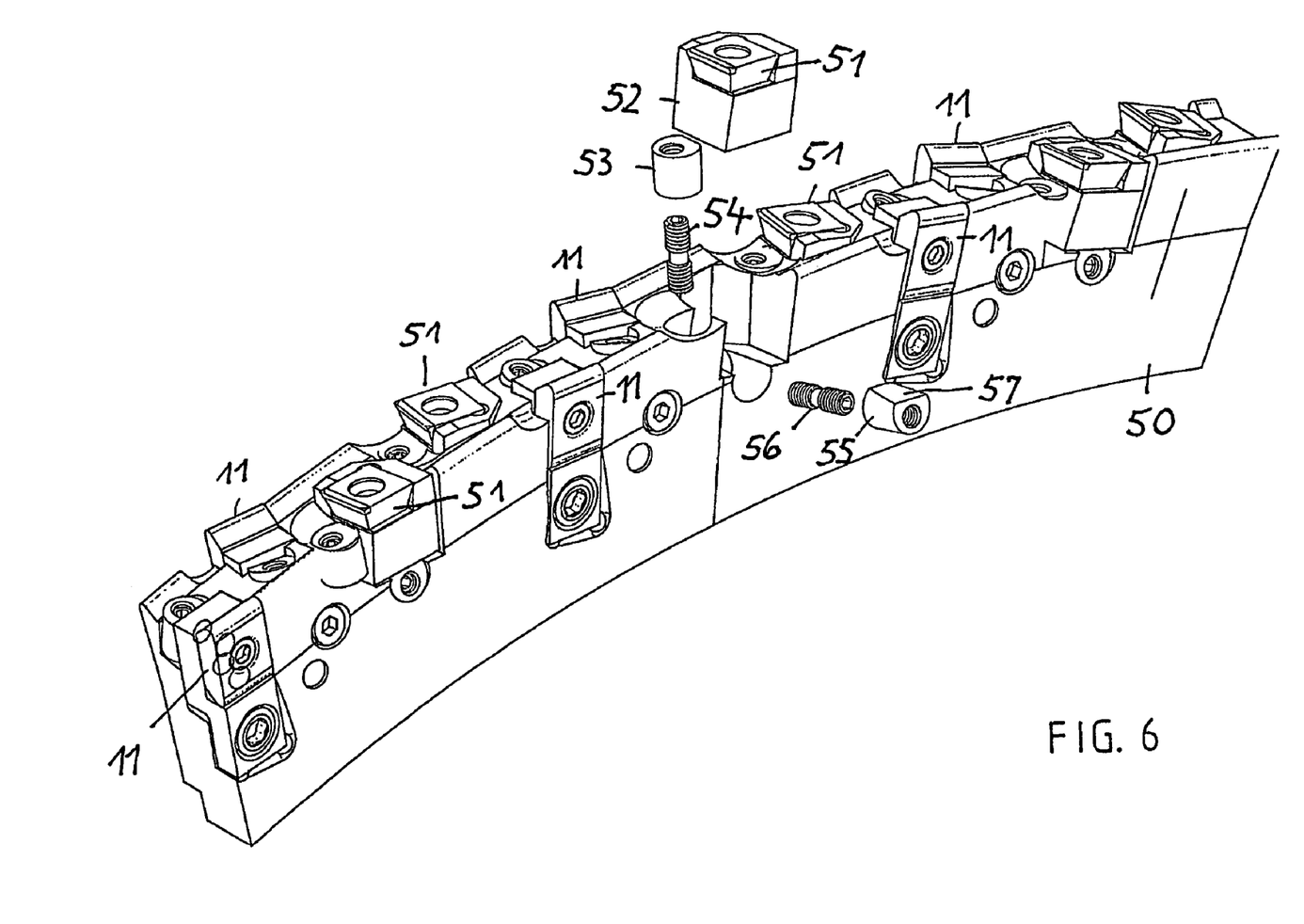
FIG. 6 is a milling tool with radially and axially clamped cutting inserts that are radially adjustable, parts of the tool being shown in exploded view.

The tool shown in FIG. 6 can in particular be used for machining a crankshaft.

The cutting inserts 11 like the cutting insert 51 can have a PKD insert and/or be made indexable.

The invention claimed is:

1. A disk- or bar-shaped tool for chip-removing machining, the tool comprising:
   a tool mount:
   at least one cassette-shaped holder axially or radially bearing on the mount;
   a respective peripheral cutting insert fixed in the holder;
   an adjustment wedge braced between the holder and the mount near where the cutting insert is fixed to the mount;
   means for moving the adjustment wedge and thereby axially or radially shifting the insert on the mount;
   at least one tangentially clamped cutting insert tangentially clamped to an upper edge of the mount and radially adjustable for working the outer surface profile of a workpiece.

2. The tool according to claim 1, wherein the tangentially mounted cutting insert is fixed in a cassette that is mounted in a tool-mount seat and is adjustable radially by an adjustment wedge.

3. The tool according to claim 2, wherein the cassette is clamped by at least one clamping wedge.

4. The tool according to claim 2 wherein the adjustment wedge is engaged by a double-threaded screw having one end engaged in a throughgoing hole of the adjustment wedge and another end in a threaded bore of the tool mount.

5. A machine tool for cutting a profile in a rotating workpiece, the tool comprising:
   a body centered having an elongated edge formed with an angularly extending row of seats each having a radially directed seat face and an axially directed seat face;
   respective Z-shaped holders in the seats each having
      an outer part forming a holder face axially confronting the respective axially directed seat face,
      an inner part offset from and generally parallel to the respective outer part and formed with a holder face radially confronting the respective radially directed seat face, and
      a middle part that extends transversely between the respective inner and outer parts, that is more flexible than the respective inner and outer parts and that extends between, and that connects the respective inner and outer parts, whereby the holder can flex at the middle part;
   respective fasteners releasably fixing the inner parts to the body against relative movement;
   respective cutting inserts on the outer parts of the holders;
   means releasably fixing the inserts on the respective holders;
   an adjustment wedge between one of the seat faces and the respective holder face and displaceable in a respective wedge direction to shift the outer part of the respective holder relative to the body and transversely of the respective one seat face; and
   respective means braced between the wedge and the body for shifting the wedge in and against the direction and thereby changing the orientation of the respective holder and insert transverse to the respective one seat face.

6. The machine tool defined in claim 5 wherein each outer part can be shifted by the respective adjustment wedge and with elastic deformation of the respective middle part up to 0.3 mm relative to the respective lower inner part.

7. The machine tool defined in claim 5 wherein the fasteners are screws.

8. The machine tool defined in claim 7 wherein the screws pass through respective throughgoing bores in the body and are threaded into respective threaded bores in the respective lower parts.

9. The machine tool defined in claim 5 wherein the cutting inserts are each indexable and have a PKD cutting edge.

10. The machine tool defined in claim 5 wherein the one seat face is the axially directed seat face and the respective holder face is the axially directed holder face.

11. The machine tool defined in claim 5 wherein the one seat face is the radially directed seat face and the respective holder face is the radially directed holder face.

12. The machine tool defined in claim 11, further comprising:
   respective other adjustment wedges each between a respective one of the axially directed seat faces of the respective seat and the axially directed holder face of the respective holder; and
   respective means braced between the other wedges and the body for shifting the other wedges in and against the respective wedge direction and thereby changing the orientation of the respective holder and insert generally parallel to the axis.

13. The machine tool defined in claim 5 wherein the means braced between the wedge and the body is a double-threaded extending in the respective wedge direction and having one end threaded into the body and an oppositely threaded end threaded into the respective holder.

14. The machine tool defined in claim 5 wherein each seat further has an angularly directed seat face and each holder has a respective angularly directed seat face confronting the respective angularly directed seat face, the tool further comprising:
   respective other adjustment wedges each between a respective one of the angularly directed seat faces and the respective angularly directed holder face and displaceable in a respective wedge direction to shift the respective holder relative to the body and angularly of the axis; and
   respective means braced between the other wedges and the body for shifting the respective other wedges in and against the respective wedge direction and thereby changing the orientation of the respective holder and insert angularly and tangentially of the axis.

15. The machine tool defined in claim 5, further comprising respective retaining screws each engaged through a respective throughgoing hole in the body and threaded into a respective threaded hole opening on the respective one holder face for pressing the holder tightly against the respective adjustment wedge.

* * * * *